United States Patent
Keller et al.

(10) Patent No.: US 9,911,952 B2
(45) Date of Patent: Mar. 6, 2018

(54) BATTERY MODULE FOR A MOTOR VEHICLE

(71) Applicant: Dr. Ing. h.c. F. Porsche Aktiengesellschaft, Stuttgart (DE)

(72) Inventors: Ralf Keller, Niefern-Oeschelbronn (DE); Eduard Ewert, Karlsruhe (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 15/021,986

(22) PCT Filed: Jun. 24, 2014

(86) PCT No.: PCT/EP2014/001703
§ 371 (c)(1),
(2) Date: Mar. 15, 2016

(87) PCT Pub. No.: WO2015/051861
PCT Pub. Date: Apr. 16, 2015

(65) Prior Publication Data
US 2016/0233466 A1    Aug. 11, 2016

(30) Foreign Application Priority Data
Oct. 9, 2013    (DE) ........................ 10 2013 111 146

(51) Int. Cl.
*H01M 2/00*    (2006.01)
*H01M 2/10*    (2006.01)

(52) U.S. Cl.
CPC ....... *H01M 2/1077* (2013.01); *H01M 2/1094* (2013.01); *H01M 2220/20* (2013.01)

(58) Field of Classification Search
CPC ...................................................... H01M 8/02
See application file for complete search history.

(56) References Cited

U.S. PATENT DOCUMENTS

| 5,346,786 A | 9/1994 | Hodgetts |
| 5,823,502 A | 10/1998 | Greiner et al. |
| 8,403,090 B2 | 3/2013 | Fujiwara et al. |

(Continued)

FOREIGN PATENT DOCUMENTS

| DE | 195 46 556 | 11/1996 |
| DE | 10 2007 063 187 | 4/2009 |

(Continued)

OTHER PUBLICATIONS

International Search Report.
German Search Report dated Mar. 12, 2014.

*Primary Examiner* — Jacob Marks
(74) *Attorney, Agent, or Firm* — Gerald E. Hespos; Michael J. Porco; Matthew T. Hespos

(57) ABSTRACT

A battery module (10) for a motor vehicle has at least one battery cell (12) for producing and storing electrical energy and a rigid battery frame (14) in which the at least one battery cell (12) is accommodated. An absorption element (24) is secured to the battery frame (14) by connection sections (28). The absorption element (24) is spaced apart from the battery frame (14) in such a way that a cavity (26) is formed between the absorption element (24) and the battery frame (14).

7 Claims, 3 Drawing Sheets

(56) References Cited

U.S. PATENT DOCUMENTS

| | | | |
|---|---|---|---|
| 2002/0006545 A1* | 1/2002 | Marukawa | H01M 2/0257 429/156 |
| 2010/0119931 A1 | 5/2010 | Shishido et al. | |
| 2012/0103714 A1 | 5/2012 | Choi et al. | |
| 2012/0129018 A1 | 5/2012 | Eckstein et al. | |
| 2012/0231320 A1 | 9/2012 | Heck et al. | |
| 2012/0261206 A1 | 10/2012 | Yasui | |
| 2012/0312614 A1 | 12/2012 | Fujiwara et al. | |
| 2013/0330587 A1* | 12/2013 | Takahashi | H01M 2/1077 429/99 |

FOREIGN PATENT DOCUMENTS

| | | |
|---|---|---|
| DE | 10 2009 035 463 | 2/2011 |
| DE | 10 2009 053 138 | 5/2011 |
| DE | 10 2010 013 150 | 9/2011 |
| DE | 10 2011 005 403 | 6/2012 |
| DE | 10 2011 075 676 | 11/2012 |
| EP | 2 390 943 | 11/2011 |
| JP | 2008269895 A | 11/2008 |

\* cited by examiner

BATTERY MODULE FOR A MOTOR VEHICLE

BACKGROUND

1. Field of the Invention

The invention relates to a battery module for a motor vehicle. The invention further relates to a motor vehicle drive train comprising an electrical machine for providing drive power and comprising a battery module for providing electrical energy for the electrical machine.

2. Description of the Related Art

In the field of motor vehicle engineering, it is generally known to use electrical energy stores in order to supply electrical energy to the motor vehicle, for example for the purpose of driving a drive machine. Energy stores of this kind usually are accommodated in a stable battery housing for the purpose of protecting against damage. Damage can occur to the electrical energy store under high acceleration forces or deformation of the body of the motor vehicle, for example in the event of the motor vehicle being subject to an impact. Since damage to the electrical energy store of this kind, particularly in the case of powerful traction batteries, presents a high risk potential for occupants of the motor vehicle and other persons, the electrical energy store in the motor vehicle has to have special apparatuses to protect against damage.

DE 10 2009 053 138 A1 discloses an energy absorption apparatus for the purpose of protecting an electrical energy store of a motor vehicle, in which energy absorption apparatus the electrical energy store is provided with associated energy absorption elements which serve to absorb deformation energy in the event of the vehicle being subject to an impact and as a result protecting the battery against damage. One disadvantage of this is that the energy absorption elements are complicated to manufacture and, in the event of an impact, not all of the deformation energy can be absorbed by the absorption elements, so that a mechanical force is exerted on the energy store and can lead to damage.

The object of the invention is therefore to provide a battery module for a motor vehicle, in which battery module an electrical energy store is protected against damage with a low level of technical complexity.

SUMMARY

The invention relates to a battery module for a motor vehicle, comprising at least one battery cell for providing and storing electrical energy, a rigid battery frame in which the at least one battery cell is accommodated, and an absorption element that is fixed to the battery frame by fixing sections. The battery module is configured so that the absorption element is kept at a distance from the battery frame, and so that a hollow space is formed between the absorption element and the battery frame.

The motor vehicle drive train of the invention is configured so that the battery module is a battery module according to the invention.

The absorption element is kept at a distance from the battery frame. Thus, a deformation zone can be formed between the battery frame and the absorption element, so that, in the event of the motor vehicle being subject to an impact, the absorption element can initially absorb deformation energy without mechanical force being exerted on the battery frame and the battery cell that is accommodated in the battery frame. As a result, the battery cell can be protected against damage in an effective manner and with a low level of technical complexity in this way.

In one embodiment, the absorption element is in the form of a panel that, at its ends, is fixed to the battery frame. In this way, the absorption element can be produced and fitted with a low level of technical complexity.

The battery frame may have an external panel that faces the absorption element. In this way, the battery cell can be protected further against deformation of the absorption element.

The hollow space may be formed between the external panel and the absorption element. In this way, a defined hollow space can be formed as a deformation zone between the absorption element and the frame.

The battery module in one embodiment has a battery housing in which the battery frame is accommodated. Thus the absorption element is fixed to the battery housing. In this way, the stability of the battery housing can be increased since the battery housing is supported on the absorption element.

The absorption element may be fixed to the battery housing by screw elements. In this way, the absorption element can be fixed in the battery housing with a low level of fitting complexity.

An absorption element may be formed on each of the opposite sides of the battery frame. In this way, the battery cell can be protected on opposite sides against deformation which can occur, for example, when the motor vehicle is rammed.

The absorption element may be formed in front of or behind the at least one battery cell in a direction of travel of the motor vehicle. In this way, impact energy of the motor vehicle can be absorbed by the absorption element for different impact situations.

The absorption element may have a plurality of connecting sections on opposite sides. The connecting sections may be fixed to the battery frame. In this way, a stable connection can be formed between the battery frame and the absorption element.

The absorption element may be formed integrally with the connecting sections. In this way, the absorption element and the connecting sections can be manufactured with a low level of technical complexity.

The absorption element of one embodiment is formed from stainless steel. In this way, an absorption element which is particularly rigid and can absorb a large amount of deformation energy can be provided.

Overall, the battery module according to the invention can provide effective protection for the battery cell since the absorption element can absorb deformation energy in the event of the motor vehicle being subject to an impact and can deform by the distance of the absorption element from the battery frame, without damaging the battery cell.

The features mentioned above and those still to be explained below can be used not only in the respectively indicated combination, but also in other combinations or on their own without departing from the scope of the present invention.

Exemplary embodiments of the invention are illustrated in the drawing and will be explained in greater detail in the following description.

DETAILED DESCRIPTION

Figure 1:
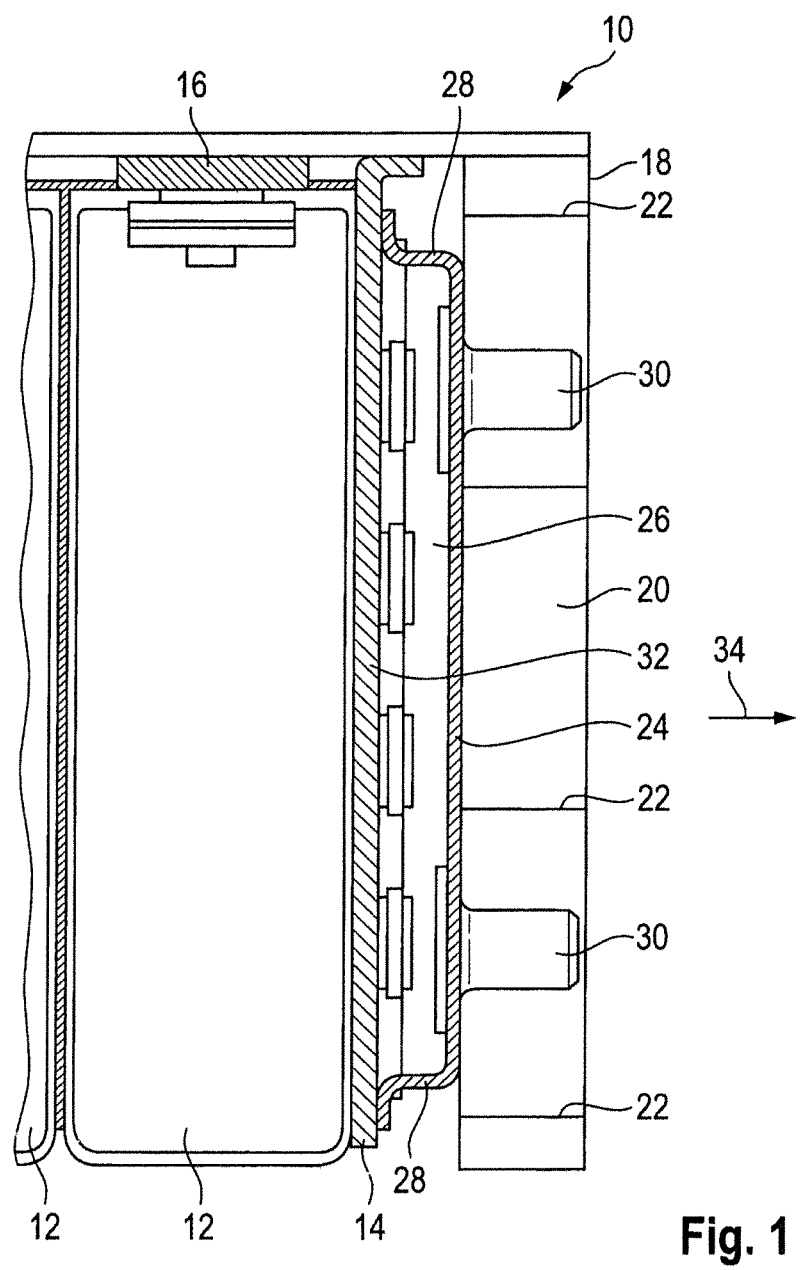
FIG. 1 shows a schematic side view of a battery module comprising an absorption element.

FIG. 1 shows a schematic sectional view of a battery module which is designated 10 in general. The battery module 10 has a plurality of battery cells 12 that are accommodated in a battery frame 14 and are mounted in the battery frame 14. The battery cells serve to store electrical energy and to provide stored electrical energy and are electrically connected to one another by means of busbars 16. The battery frame 14 is accommodated or mounted in a battery housing 18. The battery housing 18 has a housing frame 20 that has a double-walled structure with transverse struts 22 to mechanically reinforce the housing frame 20.

An absorption element 24 is in the form of a flat panel that is kept at a distance from the battery frame 14 and is fixed to the battery frame 14. A hollow space 26 is formed between the absorption element 24 and the battery frame 14. The absorption element 24 has connecting sections 28 on each of the opposite sides. The connecting sections are fixed to the battery frame 14 to establish a distance between the absorption element 24 and the battery frame 14. The connecting sections 28 preferably are formed integrally with the absorption element 24 and fixed to the battery frame 14. In a particular embodiment, the connecting sections 28 can also be separate spacers 28 that establish a distance between the flat absorption element 24 and the battery frame 14. The absorption element 24 is kept at a distance of greater than 3.5 mm from the battery frame 14, so that the hollow space 26 is formed with a size of greater than 3.5 mm.

The battery housing 18 generally is screwed fixedly to the absorption element 24 by screw elements 30, so that the battery housing 18 can be supported on the absorption element 24 and in this way the stability of the housing frame 20 can accordingly be increased.

Since the absorption element 24 is kept at a distance from the battery frame 14, a deformation space can be formed, so that the absorption element 24 can be deformed in the event of the motor vehicle being subject to an impact, without the battery cells 12 having to absorb mechanical energy and accordingly not being damaged.

The absorption element 24 preferably is arranged on the battery frame 14 as an end panel. More particularly, the battery frame 14 has an external panel on a side that faces the absorption element 24 in order to increase the stability of the battery frame 14. Accordingly, the hollow space 26 is formed between the external panel 32 of the battery frame 14 and the absorption element 24.

When the battery module 10 is in the installed state, the absorption element 24 is arranged in a direction of travel of the motor vehicle, as indicated by an arrow 34 in FIG. 1. In this way, the impact energy can be absorbed by the absorption element 24 in an effective manner in the event of the motor vehicle being subject to an impact.

Figure 2:
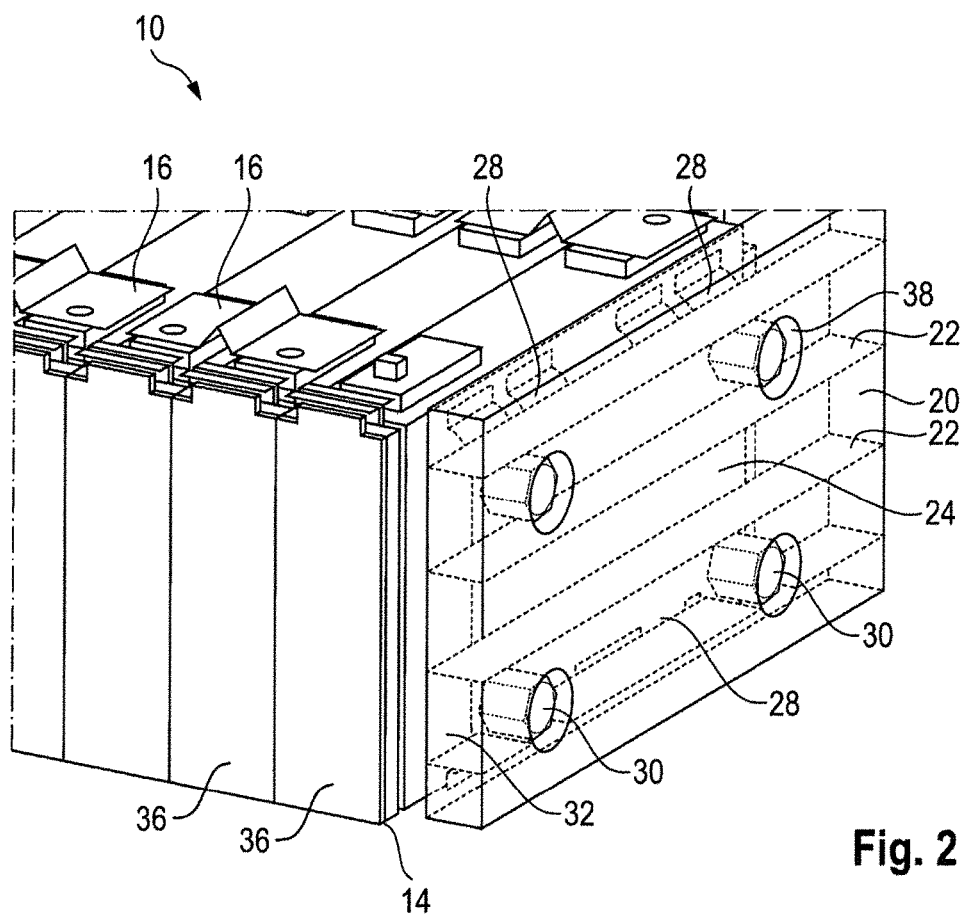
FIG. 2 shows a perspective partial view of a battery module comprising an absorption element and a battery housing.

FIG. 2 is a perspective illustration of a schematic partial view of the battery module 10. Identical elements are provided with the same reference numerals, with only the special features being explained here.

The battery frame 14 is formed from individual segments 36 that extend in a vertical direction of the battery module 10. The battery frame 14 has the external panel 32 on an end face of the battery arrangement 10, and the absorber element 24 is fixed to the battery frame 14 at a distance from the external panel 32. The absorber element 24 is in the form of a metal panel and is preferably manufactured from stainless steel. The metal panel has the connecting sections 28 on each of the opposite longitudinal sides, with the connecting sections being fixed to the battery frame 14, for example by welded connections. The connecting sections 28 are bent sections of the metal panel that forms the absorber element 24 and are connected integrally to the metal panel. The metal panel that forms the absorber element 24 is arranged at a distance from the battery frame 14 or the external panel 32 by means of the connecting sections 28, so that the hollow space 26 is formed as a deformation zone between the two panels. The housing frame 20 is fixed or fixedly screwed to the absorber element 24 by means of the screw elements 30. The screw elements 30 are recessed into recesses 38 in the housing frame 20.

Since the housing frame 20 is fixed to the absorber element and the absorber element 24 is kept at a distance from the battery frame 14 by means of the connecting sections 28, the housing frame 20 and the absorber element 24 can absorb deformation energy without the battery frame 14 and the battery cell 12 accommodated in the battery frame being damaged. Deformation energy can be absorbed by deformation of the absorber element 24 in the direction of the battery frame 14. Deformation corresponding to the distance between the absorber element 24 and the battery frame 14 of at least 3.5 mm is possible without damaging the battery cell 12.

Figure 3:
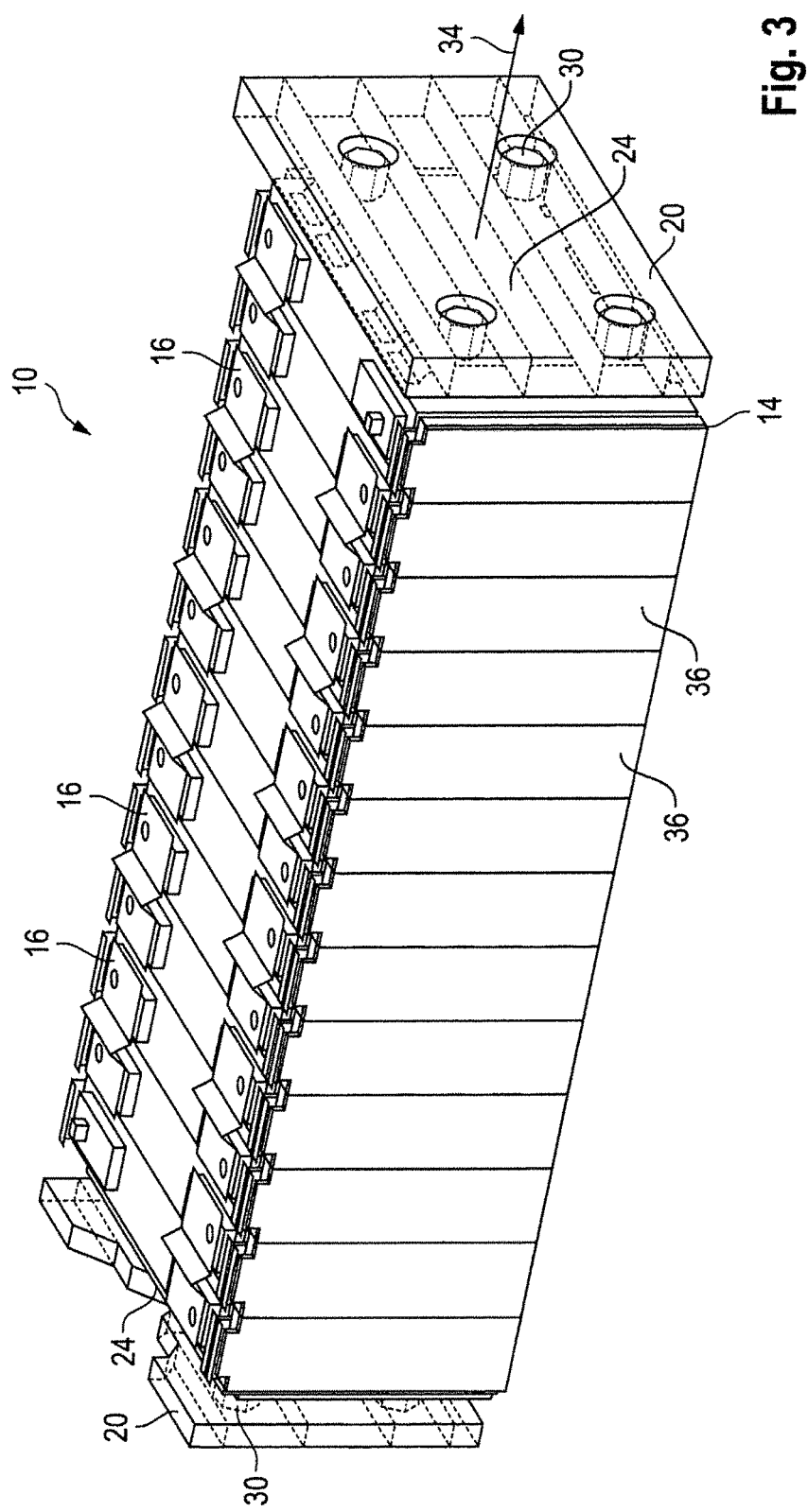
FIG. 3 shows a perspective view of a battery module comprising a plurality of battery cells and opposite absorption elements.

FIG. 3 is a schematic perspective view of the battery module 10. Identical elements are provided with the same reference numerals, with only the special features being explained here.

The battery arrangement 10 has an absorber element 24 on each of the two opposite end faces. The absorber element is fixed to the battery frame 14 in the manner described above. The absorber elements 24 are fixed respectively to end faces of the battery frame 14, specifically in front of and behind the battery frame 14 in the direction 34 of travel of the motor vehicle in order to accordingly absorb the kinetic energy or the deformation energy of the motor vehicle in the event of an impact. Each absorber element is arranged at a distance of greater than 3.5 mm from the battery frame 14 or the external panel 32, so that a deformation zone of more than 7 mm is formed by the two opposite absorber elements 24 overall.

The absorber element 24 and the deformation zone formed by the hollow space 26 enables the battery cells 12 to be protected against damage in an effective manner in the event of the motor vehicle being subject to an impact.

The invention claimed is:

1. A battery module for a motor vehicle, comprising:
   a battery housing having a housing frame and a battery accommodating space therein,
   at least one battery cell for providing and storing electrical energy,
   a rigid battery frame in which the at least one battery cell is accommodated, the rigid battery frame disposed in the battery accommodating space,
   at least one external panel mounted externally on a surface of the battery frame, and
   an absorption element having an inner surface facing the external panel and an outer surface opposite the inner surface and facing the housing, the absorption element having first and second spaced apart connecting sections fixed to the external panel, and portions of the absorption element between the first and second connecting sections spaced from the external panel to define a deformation space, and the absorption element being fixed to the housing, wherein
mechanical energy directed at the housing is transmitted to the absorption element, and the absorption element is deformed into the deformation space to protect the at least one battery cell from damage.

2. The battery module of claim 1, wherein the absorption element is fixed to the battery housing by screw elements.

3. The battery module of claim 1, wherein the battery frame has opposite sides and the absorption element is formed on each of the opposite sides of the battery frame.

4. The battery module of claim 1, wherein the absorption element is formed in front of or behind the at least one battery cell in a direction of travel of the motor vehicle.

5. The battery module of claim 1, wherein the absorption element has a plurality of connecting sections on opposite sides, said connecting sections being fixed to the battery frame.

6. The battery module of claim 5, wherein the absorption element is integrally formed with the connecting sections.

7. The battery module of claim 1, wherein the absorption element is formed from stainless steel.

\* \* \* \* \*